UNITED STATES PATENT OFFICE.

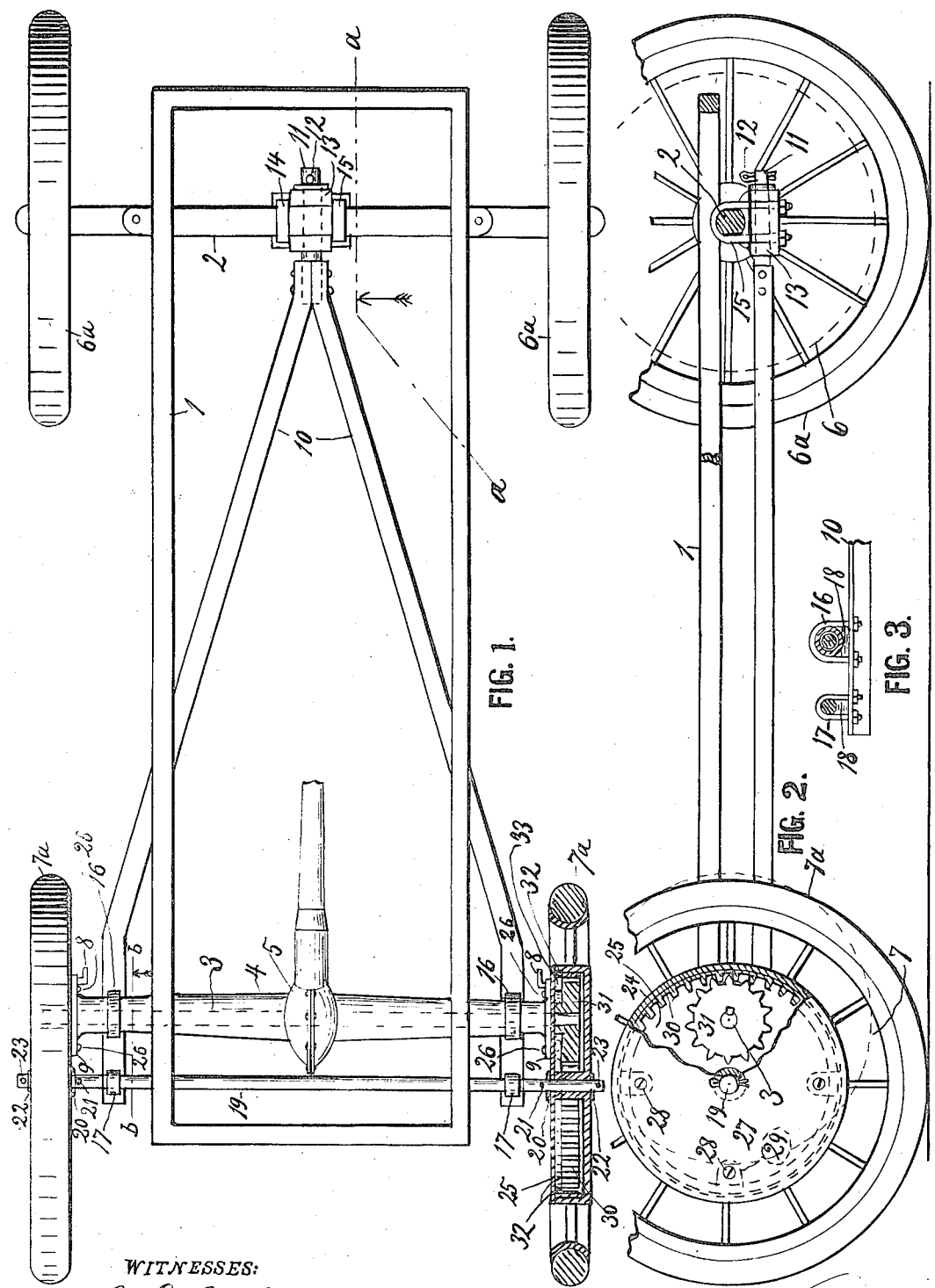

CAESAR L. WILSON, OF DASSEL, MINNESOTA.

AUTOMOBILE ATTACHMENT.

1,170,719. Specification of Letters Patent. Patented Feb. 8, 1916.

Application filed November 20, 1914. Serial No. 873,149.

*To all whom it may concern:*

Be it known that I, CAESAR L. WILSON, a citizen of the United States, residing at Dassel, in the county of Meeker, and State of Minnesota, have invented a new and useful Automobile Attachment, of which the following is a specification.

My invention relates to automobiles and auto trucks, and the principal object is to provide such vehicles with interchangeable small and large ground wheels, so that the small wheels may be used during the snowless season, and the large wheels during the winter season when snow is apt to obstruct the forward movement of the body of the vehicle if wheels of the ordinary diameter are employed.

In the accompanying drawing—

Figure 1 is a top or plan view of the frame, axles, and wheels of an auto vehicle with my large ground wheels applied to it and one of the hind wheels shown in substantially horizontal diametrical section; Fig. 2 is a side elevation of what is shown in Fig. 1 with the front portion intersected on the line $a$—$a$. Fig. 3 is a section on the line $b$—$b$ Fig. 1.

Referring to the drawing by reference numerals, 1 designates any ordinary auto vehicle frame, 2 the front axle, 3 the rear axle housing and 5 the well known housing about the differential gear (not shown).

The dotted circle 6 indicates the periphery of the regular front ground wheels, which are usually about thirty inches in diameter and serve as steering wheels, being directed by a mechanism (not shown). The dotted circle 7 designates the periphery of the regular hind wheels, which are of the same diameter as the front wheels but are secured upon the outer ends of the driving axle 3. In Fig. 1, 8 designates levers operated by means (not shown) and acting on a brake band (not shown) to expand it within the hub of each hind wheel so as to brake said wheels. The size of said hubs are indicated by the plates 9 which are fixed on the axle tube 4 and cover the otherwise open inner side of each hub. For said small wheels 6 and 7 I substitute larger wheels, $6^a$, $7^a$, which are about forty two inches in diameter or even larger for the sections of the country having deep snow for rural mail carriers and others to drive through.

The front wheels $6^a$ are simply placed on the front axle or skeins thereof in place of the smaller wheels 6. But the hind wheels require the following arrangement. A special V-shaped frame 10, preferably made of angle iron, as indicated in Fig. 3, has its front end provided with a journal 11, retained by a pin 12 in a bearing 13 secured up under the front axle by two clips 14, 15. The rear ends of said frame are secured by clips 16 and 17 and blocks 18 (see Fig. 3) to the axle tube 4 and a secondary rear axle 19, respectively. Upon each end of said rear axle is retained between washers 20, 21 and pins 22, 23, or other suitable means, the hub 24 of the large hind wheel $7^a$. Said hub is hollow and has its open inner side closed by a circular plate 25, which is fixed by screws 26 to the smaller plate 9 of the axle tube. The outer side of the hub 24 is closed by an integral plate 27, to which are secured by screws 28 lugs 29 of a circular rack or gear ring 30, which is thereby removably held in the hub so that it may be removed for repair in case any of its teeth should break or wear out. Meshing with said internal gear 30 is a pinion 31 which is fitted and secured on the end of the axle 3 from which the small hind wheel 7 has been removed.

In a suitable annular space near the gear 30 is placed a brake-band 32, which is expanded by the same cams 33 and levers 8 as actuate the smaller brake bands in the hubs of the smaller wheels 7.

In the summer season when there is no snow to obstruct the vehicle body or any downward projections of the same, the large wheels $6^a$, $7^a$ and the frame 10, axle 19, and pinion 31 are all removed and the small wheels 6, 7 replaced. My invention may in a way be considered as an attachment to automobiles and other vehicles carrying their own motive power.

What I claim is:—

1. In an autovehicle, the combination with the ordinary frame, axles, and ground wheels, of larger ground wheels adapted to be substituted for the regular ground wheels, a secondary rear axle for the larger hind wheels, means holding said axle detachably to the main frame work, a gear in the hub of said larger hind wheel, a pinion meshing with said gear, and means for securing it on the end of the regular rear axle.

2. In an auto-vehicle the combination with the ordinary frame, axles, and ground wheels and wheel hub brakes, of larger ground wheels adapted to be substituted for the regular ground wheels, a secondary rear axle for the larger hind wheels, means holding said rear axle detachably to the main frame work, a gear in the hub of said larger hind wheel and a pinion meshing with said gear, and means for securing it on the end of the regular rear axle, a brake band in the hub of the large hind wheel and arranged to be expanded into frictional contact with the hub by the same means which operated a brake band in the hubs of the small wheels.

In testimony whereof I affix my signature, in presence of two witnesses.

CAESAR L. WILSON.

Witnesses:
CHARLES SUNWALL,
JAS. OLSON.